INVENTORS:
JOHANNES JAN BROEZE
WILLEM J.D. VAN DIJCK
BY: *Oswald H. Milmore*
THEIR ATTORNEY INVENTORS:
JOHANNES JAN BROEZE
WILLEM J.D. VAN DIJCK
BY: Oswald H. Milmore
THEIR ATTORNEY

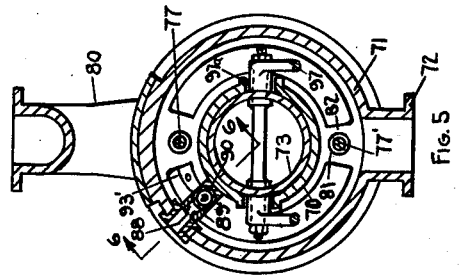

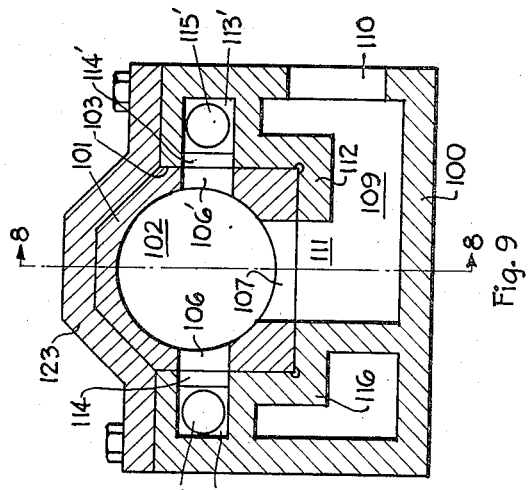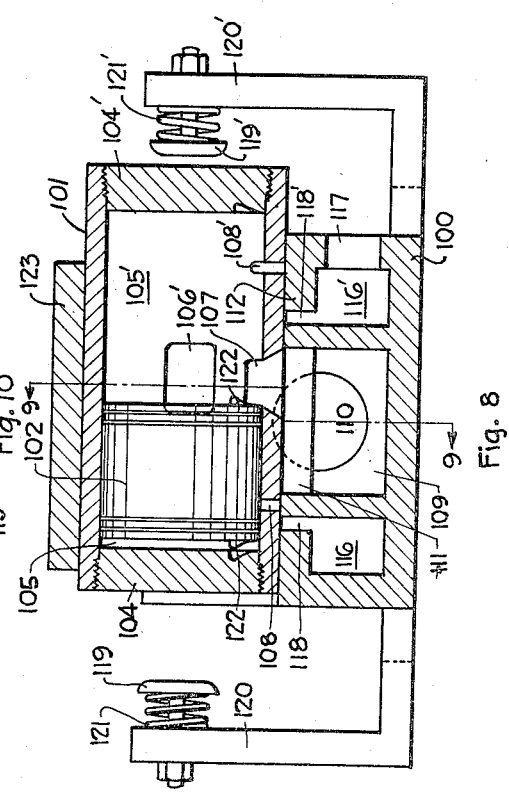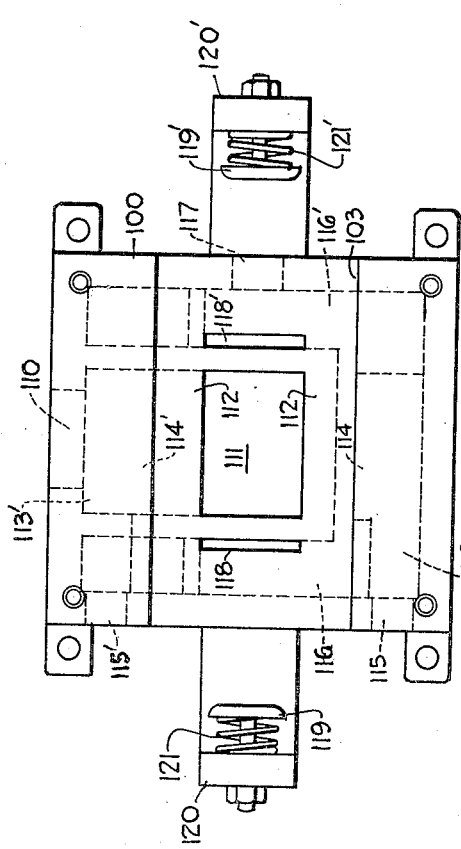

2,814,551

METHOD AND RECIPROCATING COMPRESSION-REACTOR FOR SHORT PERIOD, HIGH TEMPERATURE AND HIGH PRESSURE CHEMICAL REACTIONS

Johannes Jan Broeze, Delft, and Willem J. D. van Dijck, The Hague, Netherlands, assignors to Shell Development Company, Emeryville, Calif., a corporation of Delaware Application October 2, 1950, Serial No. 187,986

Claims priority, application Netherlands October 7, 1949

11 Claims. (Cl. 23—1)

This invention relates to improvements in the method of operating and in the construction of reciprocating compression-reactors wherein a gas containing or believed to contain a reactant is compressed and promptly thereafter expanded, whereby the reactant is brought for a short time to a high temperature. The invention may be used to perform chemical reactions, such as cracking of hydrocarbons, synthesis reactions, etc., or to determine whether such a reaction occurs when the gas is subjected to high temperature and pressure by compression. The method and apparatus are particularly suitable for vapor-phase reactions which have to occur in a very short time, e. g., of the order of microseconds up to a few hundredths of a second, in order to avoid undesirable side reactions, but may be applied to other reactions.

It has already been proposed to carry out chemical reactions at high pressure and high temperature by compressing gas in a cylinder with a reciprocable piston under conditions approaching adiabatic as closely as practicable until the desired temperature and pressure are attained and thereafter cooling the reaction products immediately by retracting the piston and expanding the products rapidly and as adiabatically as practicable. In this manner it is possible to obtain a very fast heating and cooling, which are desirable to insure the satisfactory progress of many chemical reactions.

A large amount of work is expended to compress the gas to the high pressure and temperature required to attain the desirable reaction conditions and such operations are economically practicable only when the work is, at least to a large extent, recovered during the expansion of the reaction products and usefully applied, e. g., used to compress gas in another cycle. This requirement has heretofore dictated the use of mechanical equipment with devices for accepting and storing mechanical energy, such as crankshafts and fly-wheels, springs or compressed air tanks, sometimes called "cushions." Another factor that has heretofore led to the use of such equipment is the unbalance between the work of compression and the work recovered in expansion. Owing to heat transfer to and from the walls of the compressor cylinder the compression and expansions of the gas are not truly adiabatic and reversible; further, friction between the piston and the cylinder walls and in other parts of the machine consumes energy. Owing to these heat losses and friction the energy required to compress the gas (including the reactants) usually exceeds the recovered energy and as a consequence it is nearly always necessary to supply energy to the system. This is the case not only when endothermic reactions, such as cracking reactions, or reactions having zero heat of reaction are involved, but also when slightly or moderately exothermic reactions are involved and the theoretical expansion energy is equal to or slightly greater than the compression energy. For this reason reciprocating compressor reactors proposed heretofore have employed mechanical devices for supplying mechanical energy thereto, e. g., by using reciprocating pistons connected by connecting rods to crankshafts which are driven by an external motor or by providing an auxiliary motor such as a separate reciprocating piston actuated by steam. Such apparatus have for this reason been complicated and expensive.

It has also been heretofore proposed to introduce fluid into the compressed gas during the compression cycle for cooling the gas in the compressor reactor or for altering the composition of the reacting mixture or to introduce oxygen for partial combustion of the gas. This has not, however, avoided the need for using the complicated mechanical construction noted about because it did not eliminate the need for some device for storing and utilizing the expansion energy, and because no balance between the energy supplied and the energy lost due to heat transfer and friction was attained.

The primary objects of this invention are to provide an improved method of operating a compression-reactor having an expansible compression chamber, e. g., a reciprocating engine, for compressing and expanding a gas wherein expansion energy is recovered as mechanical work and is used as mechanical work of compression in another cycle of compression and expansion, and wherein the energy required for keeping the device in operation is supplied solely in the form of a compressed injection or pressure gas supplied to the reaction zone some time during the compression and expansion cycle after commencement of the compression stroke, whereby the need for complicated mechanical devices to supply or abstract mechanical energy is obviated, and to provide an improved reciprocating compressor-reactor suitable for carrying out such a method. A further primary object is to provide a method and apparatus of the type described wherein the necessity of providing a mechanical device for storing energy recovered as work of expansion for later use in another cycle is eliminated and the expansion energy from one compression chamber of the reactor is used directly to compress gas in another compression chamber or in a plurality of other compression chambers. A further object is to provide an improved reactor of the type described that is of simple construction and may be operated without supplying shaft work to the reciprocating parts thereof. Other specific objects will become apparent from the following description.

The principles employed in this invention are: (1) to operate a plurality of compression chambers simultaneously and out of phase with each other so that the expansion energy recovered as mechanical work of expansion during the expansion part of the cycle in one or more chambers is applied directly as mechanical work of compression to compress gas in one or more other cycles carried out in other compression chambers and (2) to supply the added energy necessary for the periodic cycles of the process solely by introducing a compressed injection gas into one or more of the compressor reactor chambers at one or more times during the cycle of compression and expansion subsequent to the commencement of the compression stroke and allowing the injection gas to do work by expansion during the expansion part of the cycle. The first principle is best applied by pairing off the compression chambers, which are disposed in axial alignment and operated in opposition, although the method is not strictly limited to such an arrangement. The second principle is most advantageously employed in conjunction with the first, and in the preferred application thereof the injection gas is supplied to all of the compression chambers so as to attain balanced operation.

The operating energy is introduced by forcing the injection gas into the compression chamber under pressure exceeding that in the chamber at the time of the injection; expansion of the injected gas during the expansion stroke contributes to the mechanical work of expansion. The injection gas may have a temperature about the same as, viz., within a few hundred degrees F. above or below that of the gases already in the compression chamber, but the method is not limited to such temperatures. In view of the need to inject the injection gas at a pressure somewhat greater than that prevailing in the compression chamber at the moment of injection, this gas must be pressurized to practically the highest pressure occurring in the cylinder during the cycle if the injection is timed at the beginning of the expansion. This necessitates the compression of the injection gas to a very high pressure, often up to several hundred atmospheres, and is undesirable, especially when the injection gas is the same as the gas being treated within the reactor and is likely to become heated and undergo reaction before injection into the chamber. To avoid this, the injection gas can be supplied during the expansion part of the cycle, after the pressure in the chamber has fallen below that of the desired injection pressure. The injection raises the pressure of the gases previously in the reaction chamber and, during the subsequent part of the expansion stroke, this injection or pressure gas expands together with the said previously present gases, thereby performing work the amount of which can be controlled by selecting the pressure of the injection gas, and the inlet point can therefore be selected in relation to the cycle of operation to supply the requisite energy to cause the reactor to operate at the desired speed. The energy supplied can also be varied by controlling the quantity of injection gas, e. g., by controlling the duration of the injection.

Injection gas can also be introduced at a suitable point during the compression part of the cycle and thereafter compressed together with the gas previously in the compression chamber; the injection gas then expands only afterwards during the expansion stroke, in which case, of course, care must be taken that the available expansion energy of the injection gas is sufficient to keep the apparatus running at the desired speed. The influence which this compressed injection gas exercises on the composition of the resultant mixture to be compressed and on the pressure and temperature during such compression must, of course, also be taken into account. Further, the injection gas can be injected both during compression and expansion.

The gas containing the reactant which is compressed may be (a) the gas or the gas mixture which is to react i. e., it may be the reactant itself (the term reactant being herein used to denote a single substance or mixture of substances which is or are to be decomposed, e. g., by cracking, as well as one or more substances that is or are to react with another substance) or, (b) an aerosol i. e., a liquid or solid reactant dispersed in an inert gas or in a reactant, if one or more of the reactants is initially in the liquid or solid phase, or (c) an inert gas or one of the reactants in gaseous form into which the liquid to be treated or the reacting liquid is injected during the compression and after the commencement thereof. It is in many cases advantageous to add an inert gas to a reaction gas which is to be compressed, so as to increase the value of ratio $k$ of the mixture to be compressed and, subsequently, to obtain a higher temperature in the compressor at a given compression ratio. The constant $k$, as used in this specification, is the ratio of $C_p$ (the specific heat of the gas at constant pressure) to $C_v$ (the specific heat of the gas at constant volume).

The injection gas may be any gas that is compatible with the gas being treated; it may, according to the broadest aspect of the invention, be of the same or of a different composition as the gas undergoing treatment and may itself be a reactant. Thus, according to one embodiment, all of the feed gas to be compressed is supplied to the compression chamber in the form of injection gas during the compression stroke and the gas that is partially compressed in the expansible compression chamber of the reactor prior to the injection, herein sometimes referred to as the gas "previously present in the chamber," is in this case the remnant remaining in the chamber from a prior cycle after a part of the reacted and expanded gaseous mixture has been exhausted; the compression chamber may in this case be provided with only one entry port and one exhaust port. According to another embodiment the gas to be compressed is introduced through a separate entry port at or near the beginning of the compression stroke, or just prior to the end of the exhaust stroke, to displace the previously reacted mixture, and the same or a different gas is injected subsequently as injection gas at a higher pressure to supply the added energy. The injection gas may in this case be non-reactive gas, steam being particularly desired because it can be obtained at the desired pressure in a comparatively simple and cheap manner. Vapors of liquids other than water, e. g., mercury, can also be used. It is usually desirable to select an injection gas with a view to the facile separation thereof from the gas and reaction products; thus, a readily condensible substance of the type indicated is preferred when volatile reaction products are produced.

In order to obtain the desired compression temperature at not too high a pressure of compression it may be desirable to mix the gas or gas mixture which is to react, either before or during the compression, with an auxiliary carrier gas, e. g., steam, nitrogen, helium, etc., having a higher $k$ value than the first-mentioned gas or gas mixture; the same auxiliary gas can be used as the injection gas for supplying the required expansion energy. When the injection gas is injected in whole or in part during the compression stroke it has the same effect as a carrier gas and should in this case be selected with a view to insuring a high $k$ value of the resulting gaseous mixture. This use of a carrier gas with a suitable $k$ value is important particularly when hydrocarbons are to be reacted, e. g., cracked, in view of the low $k$ values of hydrocarbons and particularly of the heavier hydrocarbons. Thus, it may be advantageous to dilute such reactant gases prior to feeding them to the compression chamber with from two to ten times their volume of the auxiliary carrier gas.

The preferred reactor according to the invention for carrying out the process comprises a plurality of expansible chambers having the movable elements of one or more chambers connected for transmitting the expansion energy from one or more chambers directly to movable elements of one or more other chambers for simultaneously compressing gas therein, so that the latter need not be connected to any external device for storing, supplying or absorbing mechanical work, each chamber having exhaust means for discharging the reacted and expanded gas mixture and at least one inlet means adapted for admitting injection gas during the cycle of compression and expansion after the commencement of the compression stroke, in combination with means for supplying the injection gas under suitable pressure and controlling the admission thereof into the compression chamber to supply the energy required to operate the reactor so that the latter need not be driven mechanically by an external motor. While the apparatus, in its broadest aspect as outlined above, may utilize a plurality of cylinders having single-acting pistons coupled by a common crankshaft, in the manner of the common internal combustion engine, a further simplification can be attained by using double-acting pistons (which term is used herein generically to include single pistons having opposed pressure faces and pairs of opposed, axially aligned pistons that are interconnected or pistons mounted with parallel axes, in case the ends of the cylinder are offset and parallel) and operating according to the two-stroke cycle systems, so that while compression takes place on one side of the pistons expansion takes place on the other side. Each double-acting piston can then be fitted as a free piston in a continuous or interrupted cylinder, the parts of which are preferably but not necessarily coaxial. The expansion energy liberated during expansion on one side of the piston is thereby largely utilized for the compression on the other side of the piston by kinetic energy temporarily accumulated in the double-acting piston itself.

When a stationary cylinder having fixed cylinder heads at the outer ends is used the varying pressures on these cylinder heads produces forces which vary in value and sense and act upon the frame or walls of the cylinder, leading to vibrations. These forces can be compensated by providing a plurality of cylinders mounted with parallel axes and by operating the double-acting pistons in opposite directions. With two equal cylinders having pistons of equal masses and operated in opposite sense the forces in axial direction will be balanced, but there will still be oscillatory moments for the elimination of which it is necessary to use four cylinders in parallel arrangement. Such an arrangement is contemplated according to this invention.

It is also possible, however, with a single cylinder— which may be either continuous or consist of two coaxial, axially spaced equal halves—to insure complete elimination of forces resulting from the gas pressures and acting upon the frame whilst avoiding moments by providing movable cylinder heads or end covers as well as movable pistons and using the gas pressure forces acting upon the cylinder heads as accelerating forces for the masses of these cylinder heads or of masses connected to the heads and movable therewith. This arrangement can be realized either by mounting the entire cylinder, with the heads fixed thereto, in such a way that it is reciprocably movable in an axial direction in relation to the machine frame, or by providing cylinder heads that are movable with respect to the cylinder (which may but need not be stationary with respect to the frame). In the last mentioned case the cylinder heads are interconnected and may take the form of pistons which reciprocate near the respective ends of the cylinder for sealing the ends thereof. Such a machine has a double-acting piston, which may be called the center piston, which is freely reciprocable in response to gas pressures acting thereon and which divides the cylinder into two end compression chambers between the opposed faces thereof and the cylinder heads. The center piston will reciprocate so as to move in a direction opposite to that of the cylinder heads (and opposite to the direction of movement of the cylinder, when the heads are fixed to the cylinder) throughout at least the major part of the cycle (i. e., these may be a small phase shift), whereby the axial pressure forces acting on these parts will be completely or substantially balanced by acceleration forces to such an extent that the system no longer produces objectionable external forces or moments.

The masses of the two reciprocating parts are chosen in such a way that they are inversely proportional to their intended lengths of stroke; the relative length of stroke of the center piston in relation to the ends of the compression chamber is, of course, equal to the sum of the individual lengths of stroke. In order to co-ordinate their movements the two moving parts can, if necessary, be interconnected, for example, by racks and a toothed wheel, which, then, however, only needs to take up slight synchronizing forces which are negligible in relation to the compression and expansion energies involved.

The invention will now be described in greater detail with reference to the drawing forming a part of this specification and showing by way of illustration, certain specific embodiments, wherein:

Fig. 4 is a longitudinal sectional view of a further modification employing a stationary cylinder with movable cylinder heads;

Fig. 5 is a transverse sectional view taken on line 5—5 of Fig. 4;

Fig. 6 is a fragmentary longitudinal sectional view taken on section line 6—6 of Fig. 5 and showing parts of the injection gas inlet system of the same device;

Figure 11:
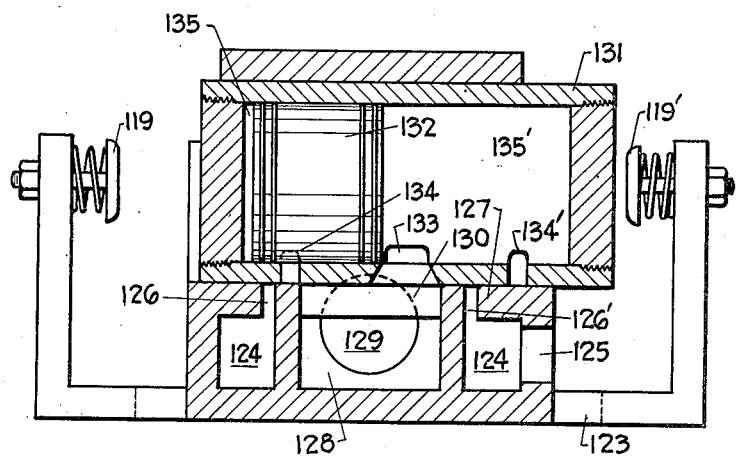

Figs. 7A, 7B, 7C, and 7D are diagrammatic views illustrating successive positions of the machine of Figs. 4–6;

Figs. 8 and 9 are a longitudinal sectional view, a transverse sectional view, respectively, a further modification employing a movable cylinder containing a free piston, taken on correspondingly numbered section lines indicated in Figs. 9 and 8;

Fig. 10 is a plan view of the stationary base of the reactor of Figs. 8 and 9; and Fig. 11 is a longitudinal section of a further modification, similar to Fig. 8, but using only one inlet port for each chamber.

Figure 1:
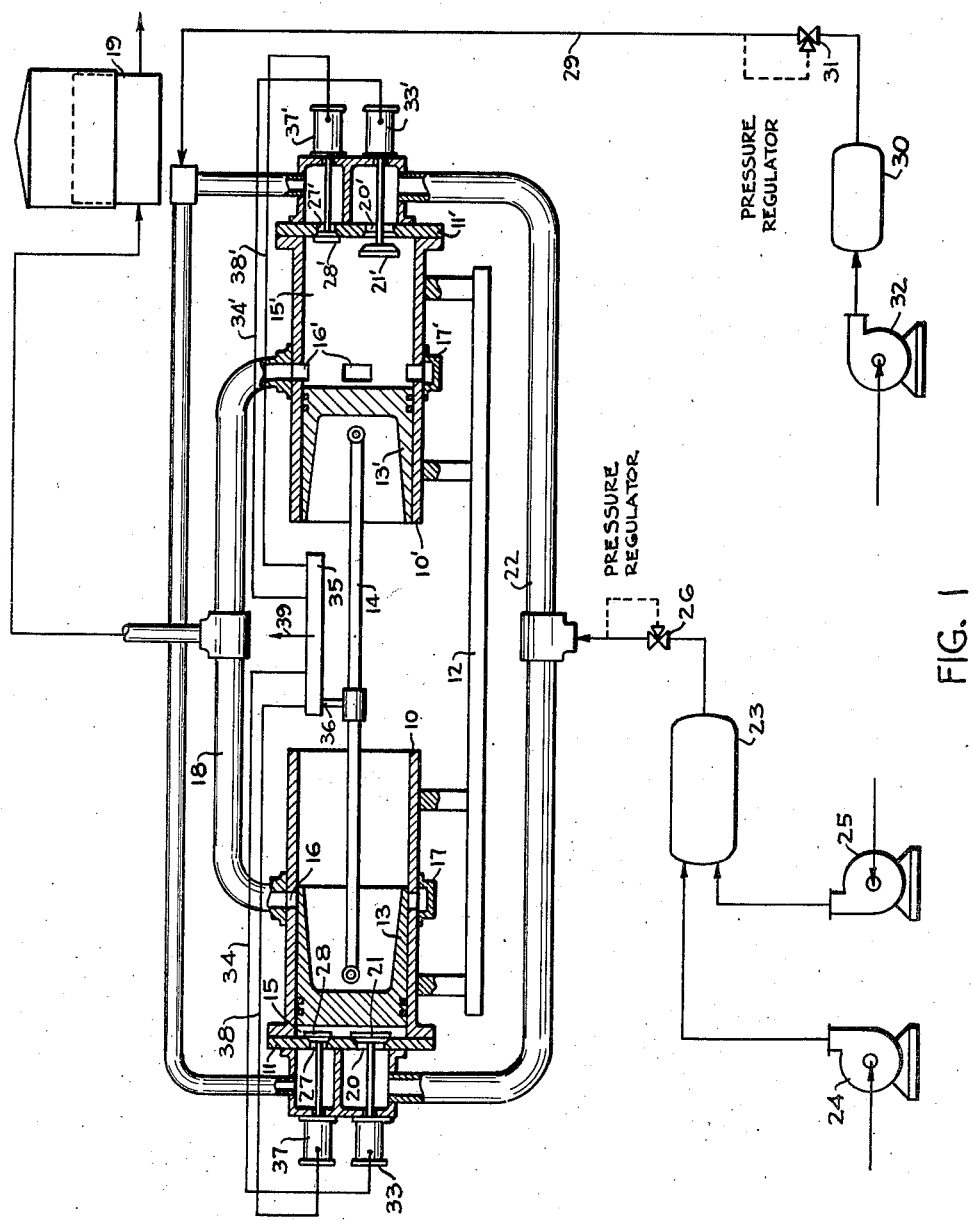
Fig. 1 is a diagram illustrating the invention as applied to the case of a stationary cylinder with a single free piston, the reactor being shown in longitudinal section.

Referring first to Fig. 1, the compression-reactor comprises a stationary cylinder having two coaxial, equal halves 10, 10', provided with stationary end covers or cylinder heads 11, 11' and mounted on a frame 12. A double-acting piston having two parts 13, 13' interconnected by a rod 14, so as to move together as a single unit, is reciprocably mounted in the cylinder and divides it into expansible compression spaces or chambers 15, 15'. A plurality of peripheral exhaust ports 16, 16' is provided for each compression chamber and located so as to be piston-controlled; the ports of each chamber are located to be uncovered at the end of the expansion stroke in the respective chamber while the other end of the piston has almost completed the compression stroke in the other chamber. These ports communicate with an annular passage in a ring 17 or 17', which are connected by a pipe 18 to a receiver or surge tank 19 for reaction products. Each cylinder is further provided with an inlet port 20, 20', controlled by a poppet valve 21, 21', and supplied with feed gas to be treated by a pipe 22 from a low pressure surge tank 23; the gas therein is pressurized to a moderately low pressure by compressor pumps 24 and 25, which may be supplied with different gases, e. g., two reactants or a reactant and an inert auxiliary carrier gas having a higher $k$ value than the reactant, respectively. The feed gas may be pre-heated by passing it through a heat exchanger, not shown. The pressure may be controlled by an optional pressure regulator 26. Each chamber is further provided with an auxiliary port 27, 27', controlled by a poppet valve 28, 28', for the admission of the injection gas which is supplied at a higher pressure through a connecting pipe 29 from a high pressure surge tank 30 the discharge pressure of which may optionally be controlled by a pressure regulator 31; the injection gas is pressurized by a compressor 32. The poppet valves may be actuated by any suitable mechanism in synchronism with the piston to open and close the valves in accordance with the operation to be described. For example, such a mechanism may include a pair of electrically operated solenoids 33, 33' connected by wires 34, 34' to a control switch 35, having a movable contact arm thereof connected to a rod 14 by a link 36. The valve spindles are provided with suitable springs (not shown) to maintain them closed when the solenoids are de-energized. The switch energizes the solenoids to open the respective valves 21, 21' at the ends of the expansion strokes in their respective compression chambers. Similarly, solenoids 37, 37' cooperate with the stems of poppet valves 28, 28' and are connected by wires 38, 38' to the control switch 35. The switch energizes the circuits 38, 38' at the times of the cycle that it is desired to inject gas, e. g. only during the intermediate part of each expansion stroke. The construction of the control switch per se is known and need not be further described. Electric power is supplied by a circuit including wire 39, it being understood that the return circuit is completed through ground.

The operation is as follows: Reciprocation of the pistons 13, 13' is initiated in any suitable manner, e. g., by moving them manually by means of the rod 14 to a position (say somewhat to the right of that shown) at which the switch 35 energizes solenoid 37, causing the valve 28 to open. Injection gas from conduit 29 now enters the chamber 15, acts on the piston 13 and forces the pistons to the right, thereby compressing whatever gas was initially present in the chamber 15'. The valve 28 closes before the end of this stroke. It will be appreciated that inertia causes the pistons to move to the right and beyond the position at which the pressures in the chambers 15 and 15' are equal, whereby at the end of the stroke the latter chamber is at a high pressure, while the former is at a lower pressure. (Also, at the right position of the pistons the piston 13 uncovers the ports 16 and the switch 35 causes valve 21 to open, so that gas containing a reactant replaces the expanded gas.) Because of the unequal pressures the pistons cannot remain stationary at the end of a stroke but now move in unison to the left, whereby the gas in the chamber 15 is compressed while that in the chamber 15' expands; again, inertia carries the pistons to the left beyond the point at which the pressures are equal, and this stroke is accompanied by a temporary opening of the valve 28' as described below.

The complete operation of one cycle may now be described. From the position shown in Fig. 1, the cylinder space 15 contains compressed gas which is undergoing or has just undergone a chemical reaction and which exerts a high pressure against the piston 13. The reaction products are being or have been displaced from the cylinder space 15' through the exhaust ports 16' by the fresh feed gas admitted through the port 29' past the open valve 21'. The piston is now accelerated to the right by the expansion of the gas in the space 15 and the exhaust ports 16' are covered by the piston 13'. Switch 35 de-energizes the solenoid of 33', thereby closing the valve 21'. Continued movement of the piston to the right compresses fresh gas in the space 15' which opposes the acceleration of the piston and eventually brings the piston to a stop. When the piston has completed a part of its stroke, for example one half thereof, the pressure of the expanding gas in space 15 has fallen to below that of the compressed gas in the pressure-regulated pipe 29; solenoid 37 is at this instant energized by the control switch, thereby opening poppet valve 28 and admitting injection gas into this space. This injection gas expands and delivers the energy necessary to balance friction, heat losses, heat of reaction, and energy lost in the admission and discharge of gas during one half of the cycle of operation, and is added in the amount required to keep the whole device in motion. The compression in the right hand cylinder space and the expansion in the left cylinder space continue until the movement of the piston is brought to a standstill. The exhaust ports 16 are then uncovered and the inlet valve 21 is opened at the end of the stroke, permitting fresh reaction gas from surge tank 23 to enter the space 15 and displace the expanded gas through the exhaust port 16. The operation is then repeated in the reverse direction during which injection gas is admitted through port 27'. In the above-described operation the switch 35 energized only the wire 38 during the movement of the piston to the right and left wire 38' de-energized, whereby the valve 28' remained closed during the compression in the space 15'. In other words, injection gas was admitted to each chamber only during the expansion. It is, however, also possible to use a control switch which opens valves 28 and 28' each time the piston occupies a predetermined intermediate position, whereby injection gas is introduced for limited periods both during the compression and the expansion in the manner described hereinafter for Figs. 8–10.

Figure 2:
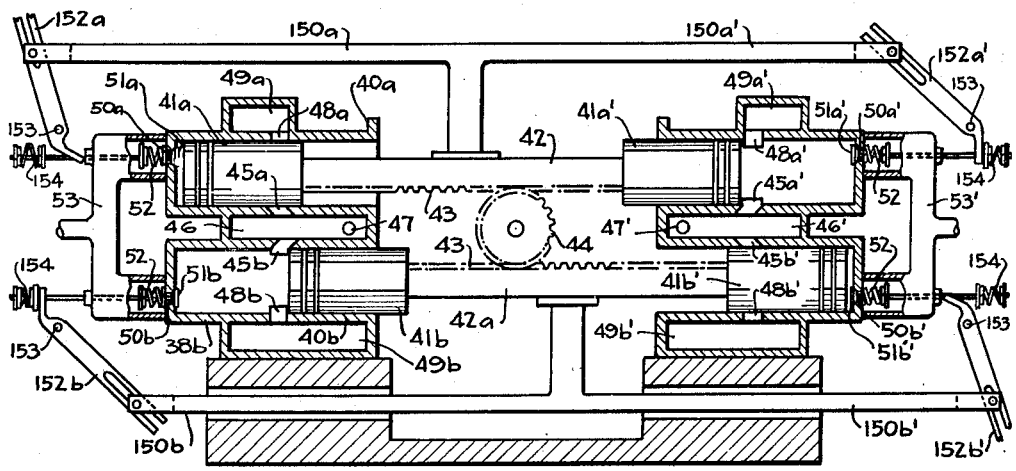
Fig. 2 is a longitudinal sectional view of a modified construction using two cylinders.

With the construction according to Fig. 1, the forces acting upon the cylinder heads produce a resulting force which acts upon the frame 12 and, as it varies in value and sense, it can cause undesirable vibrations. Figure 2 illustrates a machine in which two systems of the type shown in Fig. 1 are arranged in parallel, the surge tanks and pipes for the supply of feed and injection gas and discharge of exhaust gas and certain valve control elements being omitted, it being understood that these may be of any suitable form, e. g. as shown in the other figures. Fig. 2 shows two cylinders 40a and 40b arranged in parallel, each cylinder having two equal and coaxial halves. A double acting piston 41a, 41a' or 41b, 41b', is reciprocably mounted within each cylinder, the two parts of each piston being connected by rod 42 or 42a, having a gear rack 43 formed on one side thereof. A toothed wheel 44 meshes with the gear racks to synchronize adjacent pistons, thereby insuring that the pistons always move in opposite directions. Each cylinder half is provided with a gas inlet means comprising low pressure feed port 45a—45b' and separate means for forcing injection gas into the cylinder at high pressure, to be described. The low pressure feed ports communicate with feed gas supply chamber 46 or 46' which are supplied with feed gas through ports 47, 47'. Exhaust ports 48a—48b' communicate with individual exhaust chambers 49a—49b'. The low pressure inlet ports and the exhaust ports are located to be piston-controlled, being uncovered only at the end of each expansion stroke, and the ports being preferably inclined so that inflowing feed gas is not injected directly toward the exhaust port, thereby promoting better scavenging. Injection gas is forced into the cylinders at a higher pressure through auxiliary ports 50a—50b', provided in the cylinder heads and controlled by pressure-responsive, spring-loaded injection valves 51a—51b'; the latter are further controlled by any suitable mechanism, such as a solenoid as shown in Fig. 1 or by a slide valve as in Fig. 4 so as to be open only during a part of the expansion stroke and/or during a part of the compression stroke after some compression has been imparted to the gas previously present in the compression chamber. The specific, illustrative mechanism shown in Fig. 2 comprises tie rods 150a, 150a', 150b, 150b', connected to and reciprocable with the rods 42 or 42a and having sliding and pivotal attachments at their outer ends to first ends of rockers 152a—152b' which are pivoted on stationary supports 153. The second ends of these rockers are bifurcated and in the outer positions thereof (as shown for the rockers 152a' and 152b) engage a coiled spring 154 for yieldably urging the stems of the injection valves outwardly to their seated positions. These valve stems are further provided with coiled springs 52 which permit the valves to open only when the pressure within the respective cylinder is less than that of the injection gas which is supplied through the manifolds 53, 53'.

The operation of the reactor shown in Fig. 2 is like that previously described with the exception that both the inlet and exhaust ports are piston-controlled. During the early part of the compression stroke and the last part of the expansion stroke in each cylinder the respective rocker places its spring 154 under compression thereby maintaining the injection valve closed. At an intermediate part of each expansion and compression stroke the injection valves open, whereby injection gas is admitted twice in each cycle. During the last part of the compression stroke and the early part of the expansion stroke the high pressure in the cylinder keeps the valve closed. The gear 44 synchronizes the two pistons to move always in opposite directions but only a negligible small amount of power is transmitted by this gear, so that comparatively light parts may be used. When all cylinders are constructed of equal diameters and the pistons have equal masses the resulting forces in the axial direction are balanced.

Figure 3:
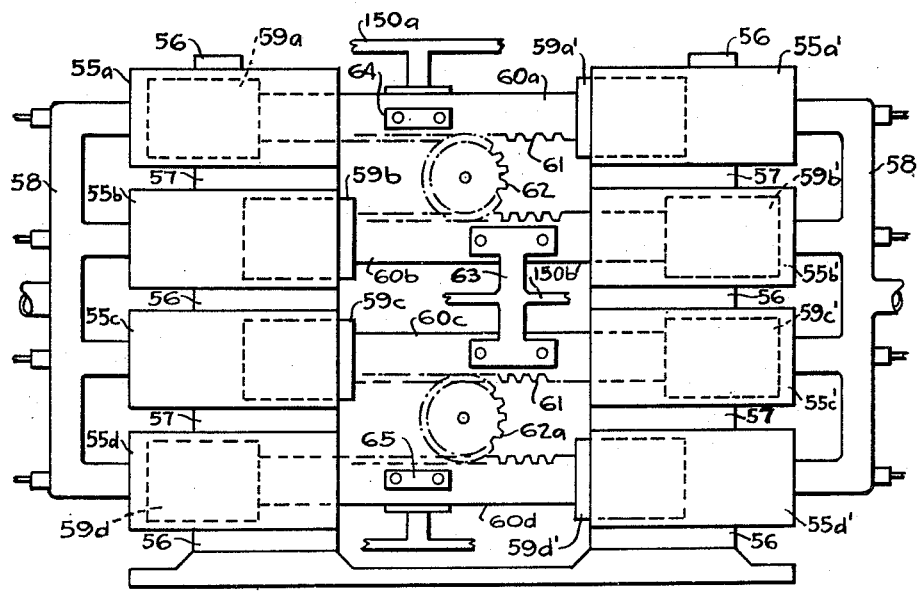
Fig. 3 is a diagrammatic elevation view of a further modification using four cylinders.

Despite the balancing of axial forces in the arrangement of Fig. 2, a moment of varying values and sense still remains, tending to rotate the assembly in an oscillatory manner. This can also be eliminated by arranging three or four cylinders in parallel as shown in Fig. 3 or by the construction shown in Figs. 4 to 6. Considering first the former, Fig. 3 shows four cylinders $55a$—$55a'$, etc., arranged in parallel, each cylinder being constructed as shown in detail in Fig. 2, so that the reactor may be regarded as two of such reactors placed side by side. Exhaust chambers are indicated at 56, feed gas chambers at 57, and the manifold for injection gas at 58. The double pistons $59a$—$59a'$, etc., are provided with connecting rods $60a$—$60d$ having gear racks 61 meshing with gears 62 and $62a$. The two intermediate rods are interconnected by a rigid link 63 constraining them to move in unison, out of phase with the outer rods, which are provided with weights 64 and 65 to compensate for the weight of the link 63 and make the mass of each outer piston equal to one half of the combined masses of the intermediate pistons.

The operation of the reactor according to Fig. 3 is like that of Fig. 2, and the outermost pistons move always in directions opposite to those of the intermediate pistons. It is evident that this arrangement may be modified by using, for example, a larger cylinder at the center instead of two intermediate cylinders as shown, whereby the reactor would have three cylinders.

Referring next to Figs. 4 to 6, the reactor comprises a stationary cylinder 70 mounted within a shell or casing 71, the space between the cylinder and shell serving as a supply chamber for the gas to be treated, which is fed through an inlet 72 from a suitable low pressure source, e. g., as described for Fig. 1. A single, double-acting reciprocable center piston 73 divides the cylinder space into two expansible compression chambers 74, 74', these chambers being closed off at the ends by reciprocable end pistons 75, 75' which constitute movable cylinder heads. The pistons 73, 75 and 75' may be provided with sealing rings, as shown. Each movable cylinder head or end piston is connected to a spider-like support 76 or 76', these supports being interconnected by tie rods 77, 77' extending longitudinally and externally of the cylinder, so that the end pistons move in unison. The cylinder is provided with two rings of exhaust ports 78, 78' communicating with annular passageways 79, 79', respectively, which in turn communicate to the outside with an exhaust manifold 80. The tie rods are guided in bushings 81 fitted in the supports 82 extending between the shell and cylinder. The exhaust ports 78, 78' are located to be controlled by the piston 73 and are uncovered at the end of the expansion in the respective chamber. Feed gas is admitted into the cylinder through rings of inlet ports 83 and 83' near the ends of the cylinder which communicate with the space inside of the shell 71 and are located to be controlled by the end pistons 75 and 75', respectively. The ends of the cylinder are provided with longitudinal slots 84, 84' through which extend the arms of the longitudinally reciprocable spider supports 76, 76'.

Injection gas is supplied to the cylinder through injection ports 85 and 85' fitted with spring-pressed, non-return, pressure responsive poppet valves 86 and 86', respectively. These ports communicate with conduits 87 and 87', respectively, which in turn receive injection gas from an inlet 88 and branch conduits 89, 89'. The inlet 88 may be connected to any high pressure source, e. g., as described for Fig. 1. The injection ports are advantageously located at the points of nearest approach of the intermediate and end pistons, as indicated for the port 85' in Fig. 4. The valves 86, 86' remain closed except when the pressure of the gas in the conduits 87, 87' exceeds that within the compression chambers 74, 74'. To insure that admission of injection gas takes place only during the desired part of the cycle, e. g., only during the expansion stroke, there is provided an auxiliary valve cylinder 90 communicating near its ends with the branch conduits and somewhat toward the center with the conduits 87, 87'. A piston slide valve having valve pistons 91, 91', fixed to a valve control rod 92, is reciprocable within the valve cylinder and actuated by strikers 93, 93' fixed to the tie rod 77, which reciprocates with the end pistons. The slide valves are actuated by the strikers to be closed at least during the early part of the contraction of the respective chamber and to be opened after commencement of the contraction. In the arrangement illustrated, wherein injection takes place only during the expansion, the slide valve is opened only during the last half of the contraction, when the pressure in the chamber has risen to a level sufficient to prevent opening of the poppet valve. The valve is preferably closed late during last half of the expansion.

In Fig. 6 the tie rod 77 is shown in the extreme left position, corresponding to the position of the pistons shown in Fig. 4 so that the next expansion will occur on the right. In this position the valve control rod 92 is in its left position by virtue of engagement of striker 93' with the right end thereof, and the valve pistons permit the flow of injection gas only to the right conduit 87'; gas will not, however, be injected in this position because the gas under compression in the chamber 74' exceeds that of the injection gas. Expansion of the compressed gas accelerates the center piston 73 to the left and the end pistons to the right. This causes these pistons to cover the exhaust and inlet ports 78 and 83, respectively, of the left chamber, effecting compression of gas therein. When the pressure in the right chamber 74' has fallen to below that of the injection gas the valve 86' opens to admit injection gas; the valve 86 remains closed during the compression stroke despite the initial low pressure in space 74 because the piston 91 prevents the flow of injection gas to conduit 87. Toward the end of this movement of the pistons the striker 93 engages the left end of the valve control rod, pushing the piston valves to the right of a position symmetrical with that shown in Fig. 6 and shutting off the conduit 87'; this causes the valve 86' to close to stop the admission of injection gas at or already somewhat before the end of the expansion in chamber 74'. The movement of the piston valves simultaneously admits injection gas into the left conduit 87, but by this time the pressure in the compression chamber 74 has risen to above that of the injection gas, so that the valve 86 remains closed during the compression stroke. At the end of this stroke the exhaust and inlet ports 78' and 83' are uncovered and the reacted gas is expelled and replaced by fresh feed gas. The cycle is then repeated in the reverse direction.

The movements of the center piston and the end pistons can, if necessary, be co-ordinated by providing a pair of synchronizing levers 94, 94', one on each side of the cylinder, pivoted on a journal 95 and located within the shell 71. The ends of the levers are connected by pivoted connecting rods 96 and 97 to the end and center piston, respectively, the connections to the center piston being through a longitudinal slot $97a$ in the cylinder. The ratio of the arm lengths of the levers 94, 94' is selected in proportion to the lengths of the stroke of the pistons, which, in turn, are dependent on the ratio of the masses.

Figure 7A:
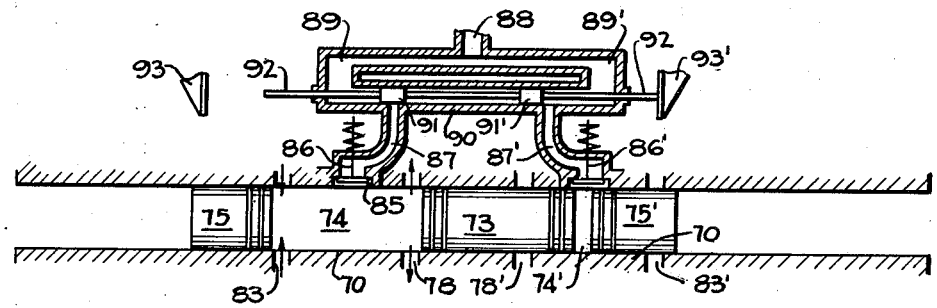
Figure 7B:
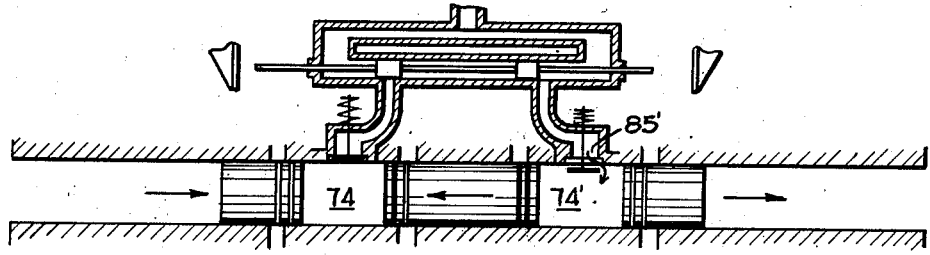
Figure 7C:
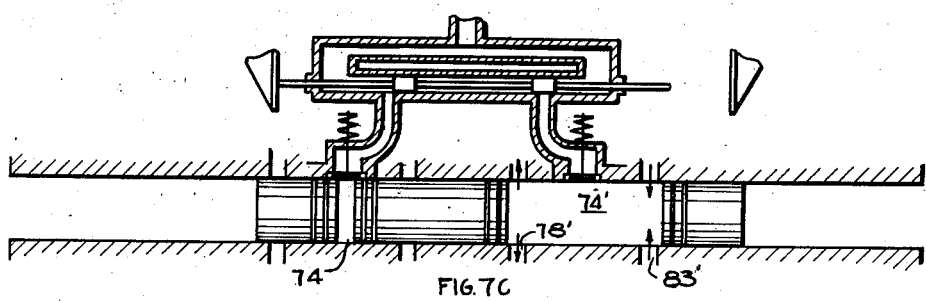
Figure 7D:
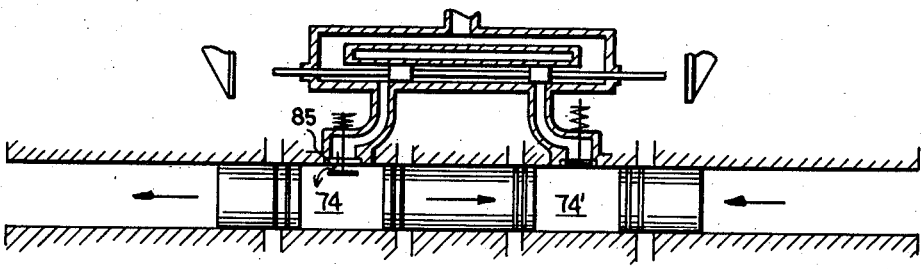

The operation of the machine according to Figs. 4–6 is illustrated diagrammatically in Figs. 7A, B, C and D. 7A shows the reactor in the position previously described for Fig. 4, with feed gas entering the chamber 74 while reacted gas is leaving therefrom and gas at high pressure and temperature is undergoing or has undergone reaction in the chamber 74'. The pistons are stationary. In Fig. 7B the pistons are in motion in the directions shown by the arrows and have completed slightly more than half of their strokes; the valve 86' is open and injection gas is entering the right chamber 74', while the left striker 93 is about to engage the left end of the valve control rod 92. The pressures in chamber 74 and 74' are almost equal in this position, and the pistons are moving at about their maximum velocities. In Fig. 7C the pistons have completed their strokes and are stationary; the gas in the left chamber 74 is at a high pressure and temperature is undergoing or had undergone reaction; feed gas is entering the right chamber 74' and displacing the reacted, expanded gas; and the control rod 92 has been shifted fully to the right. In Fig. 7D the pistons are again in motion, having completed almost half of their strokes and attained almost their maximum velocities; the gas in the chamber 74 is undergoing expansion and that in the chamber 74' undergoing compression; valve 86 is open and injection gas is being admitted into the expanding gas; and the striker 93' is about to engage the right end of the control rod 92.

Figs. 8, 9 and 10 show another embodiment wherein both the piston and the end cylinder covers or heads reciprocate in opposite directions, but differs from that of Figs. 4–6 in that the cylinder reciprocates together with the cylinder heads. Only three essential parts are required: A stationary base or slide bed 100, a reciprocating cylinder 101 and a reciprocating piston 102. The base has a longitudinal, cylindrical recess 103, e. g. of rectangular cross section as shown in Fig. 9, along which the cylinder 101 reciprocates, the bottom and sides of the cylinder being shaped to fit the recess. The cylinder has end covers or cylinder heads 104, 104' secured thereto in any suitable manner, e. g., by being screwed or bolted on, so as to transmit axial thrust to the cylinder. The piston 102 divides the interior of the cylinder into two compression chambers 105, 105', both of which are served by the same pair of exhaust ports 106, 106' at the sides of the cylinder, and by a common inlet port 107 at the bottom of the cylinder. The inlet and exhaust ports are located to be in communication with each respective chamber when the chamber is fully expanded and to be shut off from the chamber upon movement of the piston relative to the cylinder to contract the respective chamber. Thus, when the piston is at the left end of the cylinder, as shown in Fig. 8, the contracted chamber 105 is isolated from these ports and inlet and exhaust ports communicate with the fully expanded chamber 105', the reverse being true when the piston is at the extreme right; at an intermediate position of the piston relative to the cylinder both chambers are isolated from these ports. The piston therefore controls the inlet and exhaust ports in such a way that in the final positions of the piston near each end of the cylinder, the expanded reaction products are displaced by fresh gas introduced into the expanded compression chamber at the respectively opposite end of the cylinder. It is evident that the invention is not limited to the illustrated embodiment wherein the same inlet port serves both chambers or the same exhaust ports serve both chambers, and separate, axially spaced ports may be provided for the separate chambers, particularly when a longer piston is used. The piston may optionally be provided with one or more deflectors 122 for directing the fresh gases in the desired flow path to avoid any considerable overall mixing, suitable niches being formed in the cylinder heads to receive the deflectors, as shown. Each chamber is provided with a separate injection port 108, 108', spaced somewhat toward the respective cylinder heads from the exhaust ports as shown.

The base 100 is of compartmented construction to provide three separate channels as follows: (1) Channel 109 is located centrally, at the bottom, and receives low pressure feed gas through an inlet opening 110 from any source; it communicates through a supply port 111 in the horizontal partition wall 112 with the inlet port 107. The port 111 is longitudinally elongated so as to be in communication with the port 107 at least in those positions of the cylinder in which the port 107 is uncovered by the piston; in the embodiment shown port 111 is continuous so as to communicate with port 107 in all positions of the cylinder whereby the inlet port 107 is controlled exclusively by the piston 102. (2) Channels 113, 113' at the level of the sides of the cylinder communicate with exhaust ports 106, 106', respectively, through ports 114, 114'; the latter are also elongated so that the exhaust ports 106, 106' are in communication therewith as described for the supply port; similarly, in the embodiment shown they are controlled exclusively by the piston 102. Channels 113, 113' communicate with exhaust outlets 115, 115', respectively, at the left side of the bed. (3) Channels 116, 116' at the left and right ends of the bed, respectively, and at the bottom communicate with an inlet opening 117 through which injection gas under suitable high pressure is admitted; they further communicate through ports 118, 118' with the injection ports 108, 108', respectively, in certain relative portions of the cylinder and bed. The passage of injection gas from the inlet 117 into compression chambers is accordingly, controlled both by the position of the piston 102 in relation to the cylinder 101 and by the position of the latter in relation to the bed 100, and the piston and bed 100 jointly constitute control means to close the injection ports.

In the position shown in Figure 8, both ports 108 and 108' are closed; the cylinder is there shown in the extreme right hand position and the piston in the extreme left hand position. Reaction gas under high temperature and pressure is in the left chamber 105 while expanded gas is flowing out from the right chamber 105' through the ports 106, 106', 114, 114', 115 and 115'. In the next stroke the compressed gas in chamber 105 accelerates the cylinder 101 toward the left and the piston 102 toward the right; during this stroke the port 108 will be in registry with port 118 for a short period and this will occur after the piston 102 has moved beyond port 108. Injection gas will therefore be admitted into the left compression chamber 105 to raise the pressure therein and to do further work by expanding together with the reacted gases. A little later during this stroke, the ports 108' and 118' come into registry; this appears before the piston 102 covers the port 108', so that injection gas is admitted also into the right hand chamber 105' during this stroke. Thus injection gas is admitted into each compression chamber both during the expansion and compression strokes. At the end of this stroke the cylinder and piston occupy positions at the extreme left and right, respectively, which portions are symmetrical with those shown in Figure 8 and the cycle is then repeated in the reverse direction.

The injection gas that is admitted during the compression stroke will be compressed together with the gases previously present in the compression chamber and will supply driving energy on the subsequent expansion stroke; it can thus serve as the auxiliary carrier gas or as a portion of such carrier gas, when the feed gas supplied through the inlet 110 is already diluted with a carrier gas. For this reason it is desirable that the injection gas, or at least the part thereof injected during the compression stroke, have a high $k$ value, so as to aid in attaining a higher compression temperature at a given compression pressure. If it is desired to admit injection gas only during the expansion stroke, this can be attained with the aid of separate valves arranged in the manner described above for Figs. 4–6.

Under the influence of the varying pressures prevailing in the expansion chambers 105, 105' the cylinder and piston will reciprocate moving always in opposite sense and with stroke lengths which are inversely proportional to the masses of the two parts. If desired, one or more buffers 119, 119', reciprocably mounted on stationary brackets 120, 120' and provided with shock absorbing springs 121, 121' may be provided and located in alignment with the cylinder to insure that the cylinder moves equal distances to the right and left of its center position, i. e., the position in symmetrical relation to the base 100. It was found in actual operation that the cylinder 101 reciprocates symmetrically without touching the buffers 119, 119', so that these may be regarded primarily as optional safety devices. The bed 100 may optionally be constructed to different shapes and may have structure for retaining the cylinder in position, e. g., a cover 123 bolted thereto. The external, cylindrical surface of the cylinder need not be polygonal in cross-section, and other outlines may be used. Friction may be minimized by lubrication and/or by other expedients known per se, e. g., by replacing sliding friction as far as practicable by rolling friction, or by compensating the vertical load of the weight of the cylinder by using relief channels or the like into which pressure gas can be introducedf, etc.

As was previously noted, the reactant may be introduced as or together with the injection gas, thereby obviating the need for a separate injection channel and port. Such an arrangement is shown in Fig. 11, wherein the base or bed 123 is provided with only one inlet channel 124, communicating with a source of high pressure gas through an inlet 125 and with a pair of ports 126, 126' provided in the partition 127. A single exhaust channel 128 communicates with an outlet opening 129 and with a central port 130 in the partition 127. The cylinder 131, which contains the freely movable piston 132, has an exhaust port 133 disposed to be always in registry with the port 130 and, hence, to be controlled only by the piston, and a pair of injection ports 134, 134' arranged for intermittent registry with the ports 126, 126', respectively, at intermediate parts of the stroke of the cylinder. Buffers, springs, or the like, such as the buffers 119, 119'; may be optionally provided.

The device according to Fig. 11 is preferably used when the reactant is highly diluted in an auxiliary carrier gas, i. e., with two to ten parts of inert carrier gas having a high $k$ value for each part of reactant. This mixture is then compressed, e. g., by the compressors of Fig. 1, and fed at moderately high pressure to the inlet 125 as injection gas. In the position shown in the drawing, wherein the cylinder is at the extreme right and the piston is at the extreme left, the exhaust port is uncovered by the piston and expanded reacted gas from the right compression chamber 135' can flow out into the channel 128. However, since no feed gas is simultaneously admitted, only a part of the expanded gas is exhausted and the remaining part of this gas is again compressed when the piston moves to the right and the cylinder moves to the left due to the expansion of the compressed gas in the left compression chamber 135. During this stroke the ports 126 and 134 come into registry after the piston has uncovered the latter, thereby admitting high pressure injection gas into the expanding gas in the chamber 135. A little later the ports 126' and 134' move into the registry, causing injection gas containing reactant to be injected into the chamber 135'; this is compressed together with the partly compressed gas remaining in the chamber from the previous expansion, until the piston and cylinder come to a stop in positions symmetrical to those shown. The cycle is then repeated in the reverse direction.

In all of the embodiments described, the parts can be first set in motion by admitting pressure or injection gas into the proper compression chambers after bringing the movable parts into the proper positions to permit the gas to enter through the injection ports. For example, in the embodiment of Figs. 8-10 the cylinder can be moved by hand to the left, causing the piston to slide toward the right relative to the cylinder by inertia and the parts 108 and 118 can be brought into registry. Injection gas will then enter the chamber 105.

The devices described have characteristic frequencies which depend upon the masses of the moving parts and the compression ratio, the latter being determined in turn by the time of opening of the exhaust ports and by the energy supplied by the injection gas. The actual attained frequency of operation may be less than the characteristic frequency and will increase as more injection is introduced to approach the characteristic frequency.

It is evident that the frequencies and compression ratios can be selected to fit any desired time of reaction and temperature required for a specific chemical reaction, and the following data are presented merely to indicate, without limiting, certain operating conditions: The reactor may be operated with compression ratios of from about 20 to 1 to about 200 to 1, and the pressure at the end of the compression may reach a maximum of the order of 500 atmospheres, producing temperatures of several thousand degrees F., depending on the $k$ value of the gas. The frequencies may be of the order of 2,000 to 10,000 cycles per minute, and the reaction time may be of the order of microseconds up to several hundredths of a second. The high pressure injection gas may be supplied at a pressure of about four to twenty atmospheres.

We claim as our invention:

1. A reciprocating compression-reactor for subjecting a gas for a short time to high temperature reactions conditons comprising a base; a cylinder carried by said base having cylinder heads at the ends thereof and containing a substantially freely reciprocable double-acting piston intermediate said ends, the piston having opposed faces defining an expansible compression chamber between each cylinder head and the respectively adjacent piston face and said cylinder heads being substantially freely movable relatively to said base in response to gas pressures in said chambers and being connected for movement in unison, whereby one of said chambers is expanded when the other is contracted upon movement of the piston relative to said cylinder heads for alternately compressing and expanding gas in said chambers; exhaust means for exhausting expanded gas at a relatively low pressure from each chamber at the end of the expansion thereof; and inlet means for supplying gas to be compressed to each of said chambers, said inlet means comprising means for forcing an injection gas at a relatively higher pressure into at least one of said chambers at an established point within the cycle of contraction and expansion thereof subsequent to the commencement of the contraction for expansion of the injection gas in the said chamber to supply the mechanical work required to reciprocate the piston.

2. A reactor according to claim 1 wherein the cylinder is stationary and said cylinder heads are movable with respect to the cylinder, said cylinder heads being formed as pistons reciprocable within the ends of the cylinder.

3. A reactor according to claim 1 wherein the cylinder heads are fixed to the cylinder and the cylinder is reciprocable therewith with respect to said base.

4. A reactor according to claim 3 wherein the exhaust and inlet means comprise ports through the cylinder wall and the base is provided with ports located to be in registry with the said ports in the cylinder during at least a part of the stroke of the cylinder relative to the base.

5. In combination with the reactor according to claim 3, means for maintaining the cylinder axially centered on said base for reciprocation thereon within fixed limits on either side of a central position.

6. In combination with the reactor according to claim 3, means for maintaining the cylinder axially centered on said base for reciprocation within fixed limits on either side of a central position comprising abutment means on said base located for engagement with one or more parts of the cylinder only when the cylinder moves to said fixed limits in either direction, said fixed limits being located axially beyond the normal limits of travel of said cylinder, whereby said abutment means are normally not engaged by said parts of the cylinder.

7. A reciprocating compression-reactor for subjecting a gas for a short time to high temperature reaction conditions comprising a base; a cylinder fixed to said base; a pair of axially movable end pistons for said shell forming cylinder heads and connected together to reciprocate in unison; a substantially freely reciprocable, double-acting center piston within the cylinder, said center piston having opposed faces defining expansible compression chambers between each end piston and the respectively adjacent face of the center piston, whereby one of said chambers is expanded when the other is contracted upon movement of the piston relative to said end pistons for alternately compressing and expanding gas in said chambers; axially spaced ports for each chamber in the cylinder wall disposed to be normally covered by the center piston and the respective end piston, respectively, and to be uncovered when said pistons are separated, a port at one end of each chamber serving as an exhaust port and a port at the other end of each chamber being in communication with a source of gas to be compressed and serving as an inlet port; an injection port in the cylinder wall at an intermediate part of each chamber connected by a separate conduit to a source of high pressure injection gas; a pressure-responsive, non-return valve for each injection port disposed to open only when the pressure in the respective chamber is less than the pressure of the injection gas supplied to the valve; a slide valve interposed in said conduits for selectively shutting off the supply of injection gas to said non-return valves; and a movable actuating member for said slide valve connected to derive from the piston and arranged to shut off the supply of injection gas to each non-return valve during the expansion and to open it during the last half of the contraction of the respective chamber, whereby injection gas will be admitted into each chamber only during the expansion thereof for expansion of the injection gas therein to supply the mechanical work required to reciprocate the pistons.

8. A reciprocating compression-reactor for subjecting a gas for a short time to high temperature reaction conditions comprising a slide bed having a longitudinal recess; a cylinder with closed ends mounted for substantially free axial reciprocation in said recess; a substantially freely reciprocable, double-acting piston within said cylinder defining separate compression chambers between the respective closed ends of the cylinder and the opposite ends of the piston, whereby one of said chambers is expanded when the other is contracted upon movement of the piston and cylinder in opposite directions to that of the cylinder for alternately compressing and expanding gas in said chambers; an exhaust channel in the slide bed having port means adjacent the cylinder; exhaust port means in the cylinder for exhausting expanded gas from each chamber when the chamber is expanded and to register with said port means in the slide bed at least when the respective chamber is expanded; an injection gas supply channel in the slide bed having supply port means adjacent the cylinder; and injection port means in the cylinder disposed to be out of registry with the supply port means when the respective chamber is fully expanded and to move into registry with the supply port after partial contraction of the respective chamber by movement of the cylinder and piston in opposite directions, for admitting injection gas at an elevated pressure into each chamber only subsequently to commencement of the contraction thereof for subsequent expansion therein to supply the mechanical work required to reciprocate the piston and cylinder.

9. A reciprocating compression-reactor for subjecting a gas for a short time to high temperature reaction conditions comprising a slide bed having a longitudinal recess; a cylinder mounted for substantially free axial reciprocation in said recess and having cylinder heads closing the ends thereof and connected to transmit axial thrust to the cylinder; a substantially freely reciprocable, double-acting piston within said cylinder, said piston having opposed faces defining an expansible compression chamber between each cylinder head and the respectively adjacent piston face, whereby one of said chambers is expanded when the other is contracted upon movement of the piston and cylinder in opposite directions for alternately compressing and expanding gas in said chamber; one or more exhaust ports in the cylinder at an intermediate part thereof located to communicate with each chamber when the respective chamber is expanded and to be shut off from the chamber by the piston upon movement thereof to contract the respective chamber; an exhaust channel in said slide bed having port means located for registry with said exhaust ports at least when said ports are uncovered by the piston; injection port means in the cylinder opening into each chamber at a point therein displaced toward the cylinder head from the exhaust port so as to be in communication with the respective chamber after movement of the piston relative to the cylinder to shut off the exhaust port and effect at least partial contraction of the respective chamber; and an injection gas supply channel in the slide bed having a supply port means located for intermittent registry with the injection port means in accordance with the position of the cylinder on the slide bed so as to prevent flow communication between the injection gas supply channel and each chamber when the respective chamber is in fully expanded position and to establish flow communication only after partial contraction of said chamber to admit high pressure injection gas into the chambers for subsequent expansion therein to supply the mechanical work required to reciprocate the piston and cylinder.

10. A reciprocating compression-reactor for subjecting a gas for a short time to high temperature reaction conditions comprising a slide bed having a longitudinal recess; a cylinder mounted for substantially free axial reciprocation in said recess to either side of a central position and having fixed cylinder heads closing the ends thereof; a substantially freely reciprocable, double-acting piston within said cylinder, said piston having opposed faces defining an expansible compression chamber between each cylinder head and the respectively adjacent piston face, whereby one of said chambers is expanded when the other is contracted upon movement of the piston and cylinder in opposite directions for alternately compressing and expanding gas in said chambers; one or more exhaust ports and one or more inlet ports in the cylinder at an intermediate part thereof located to communicate with each chamber when the respective chamber is expanded and to be shut off from the chamber by the piston upon movement thereof to contract the respective chamber; separate exhaust and feed channels in said slide bed having port means located for registry with said exhaust and inlet ports, respectively, in the cylinder at least when the said ports are uncovered by the piston; additional injection ports in the cylinder located on each side of the exhaust port toward the cylinder ends so as to be in communication with the said chambers after movement of the piston relative to the cylinder to shut off the exhaust port and at least partial contraction of the respective chamber; and an injection gas supply channel in the slide bed having injection port means located for intermittent registry with the injection ports in the cylinder in accordance with the axial position of the cylinder on the slide bed so as to be out of registry with the injection ports in each extreme position of the cylinder from said central position and to be in registry at an intermediate position for injection of high pressure injection gas into the chambers only after partial contraction of said chambers for subsequent expansion therein to supply the mechanical work required to reciprocate the piston and cylinder.

11. Method of operating a compression-reactor having a plurality of expansible chambers in a continuous sequence of cycles for subjecting successive portions of a gas for short times to high temperature reaction conditions comprising, in one cycle, the steps of compressing a first portion of a gas containing a reactant in a first of said compression chambers while applying mechanical work of compression, thereby heating said gas, immediately thereafter expanding the resulting gaseous mixture while in said chamber and concurrently recovering the mechanical work of expansion, using the recovered mechanical work as mechanical work of compression for compressing another body of gas in a second of said chambers, immediately thereafter expanding the latter body of gas and concurrently recovering the mechanical work of expansion, and using the latter recovered mechanical work for compressing in the succeeding cycle a subsequent portion of said gas containing a reactant in the first compression chamber; and supplying the additional mechanical work required for continuing the series of cycles solely by admitting injection gas under pressure o the reactor for expansion therein, said admission including injecting gas into said second compression chamber at least once during each cycle of said compression and expansion therein after at least partial compression of the gas therein at a pressure higher than the pressure prevailing in said second chamber at the time of injection.

References Cited in the file of this patent

UNITED STATES PATENTS

| Number | Name | Date |
|---|---|---|
| 386,949 | Williams | July 31, 1888 |
| 1,036,288 | Matricardi | Aug. 20, 1912 |
| 1,046,392 | Kessler | Dec. 3, 1912 |
| 1,171,620 | McIntyre | Feb. 15, 1916 |
| 1,405,551 | Nichols | Feb. 7, 1922 |
| 1,586,508 | Brutzkus | May 25, 1926 |